United States Patent [19]

Tomasovich

[11] Patent Number: 4,655,171

[45] Date of Patent: Apr. 7, 1987

[54] LIVESTOCK WATERING DEVICE

[76] Inventor: Anthony J. Tomasovich, P.O. Box 482, St. Charles, Ill. 60174

[21] Appl. No.: 800,804

[22] Filed: Nov. 22, 1985

[51] Int. Cl.⁴ .......................... A01K 7/00; F24H 1/06
[52] U.S. Cl. ..................................... 119/73; 219/307; 219/381
[58] Field of Search .................. 119/73; 219/291, 306, 219/297, 307, 315, 336, 381

[56] References Cited

U.S. PATENT DOCUMENTS

| | | | |
|---|---|---|---|
| 817,593 | 4/1906 | Shipp | 219/306 |
| 1,265,849 | 5/1918 | Wheelock | 219/291 X |
| 1,478,415 | 12/1923 | Wiegand | 219/381 X |
| 1,617,889 | 2/1927 | Woodgate et al. | 219/297 |
| 1,683,920 | 9/1928 | Rohne | 219/336 X |
| 2,041,917 | 5/1936 | Florman | 219/307 |
| 2,716,179 | 8/1955 | Cornella | 219/307 |

Primary Examiner—Robert P. Swiatek

[57] ABSTRACT

A livestock watering device which includes a bucket-like container, including side walls and a bottom wall, for holding a quantity of water. A conduit, including an inlet and an outlet, forms a closed loop communicating through the side walls of the container above the bottom wall thereof. The conduit extends in the closed loop below the bottom wall of the container, and a flow-through heater is provided in the conduit for heating water therein and effecting flow of water out of the container through the outlet, through the closed-loop conduit, and back into the container through the inlet. The heater effects the water flow by heat transfer without a pump.

14 Claims, 2 Drawing Figures

LIVESTOCK WATERING DEVICE

BACKGROUND OF THE INVENTION

This invention generally relates to a livestock watering device and, particularly, to a type of watering bucket having means for continuously heating and circulating the water without power-flow or pump means.

Heated livestock watering devices have been known as long ago as the use of lanterns positioned below a watering trough for supplying heated water to poultry or other barnlot fowl or animals. Over the years, more sophisticated devices have been designed for preventing a supply of water for livestock from freezing.

For example, U.S. Pat. No. 2,472,178 to Temple, issued July 7, 1949, shows a livestock water bucket which includes a heater element that floats on the top surface of the water and is connected through conduit means extending through the water itself to an appropriate electrical source. U.S. Pat. No. 2,479,355 to Hemker, issued Aug. 16, 1949, shows a water bowl which includes a treadle inside the bowl for actuating a valve which supplies heated water to the bowl. U.S. Pat. No. 4,068,116 to McKinstry, issued July 10, 1978, shows a heating element which is designed to be submerged and rest on the bottom of a watering bucket for livestock.

In all of the above designs, the heating elements themselves or the actuating means for the supply of water are disposed directly inside the water bucket. This may be satisfactory for certain docile animals, but in the case of other animals, such as many horses, such foreign objects within the bucket itself causes a horse to reluctantly drink out of the bucket, if at all.

Another problem in using heated elements with livestock watering buckets is the accumulation of debris, such as hay or grain which is dropped into the bucket by the horse, from migrating into the flow conduit means for the bucket and either clogging the conduit or dangerously overheating the heating element itself.

Still another problem with heated water buckets which might be used in the confined quarters of a stall, for instance, is that the exterior components of the heating means or conduit means are complicated, large and cumbersome and which present a hazard whereby a horse may become entangled in the apparatus and cause serious injury.

This invention is directed to providing a new and improved heated water bucket for livestock, such as horses, which has no heating components or similar apparatus within the bucket itself and which operates without any pumps or other power-flow devices.

SUMMARY OF THE INVENTION

An object, therefore, of the invention is to provide a new and improved livestock watering device in the form of a heated water bucket.

In the exemplary embodiment of the invention, the device includes a bucket-like container, including side wall means and a bottom wall, for holding a quantity of water. Conduit means, including inlet means and outlet means, communicates through the side wall means of the container above the bottom wall thereof to thereby prevent debris which settles to the bottom of the container from entering the conduit means.

Heater means are provided for heating water in the conduit means and effecting flow of water out of the container through the outlet means, through the conduit means, and back into the container through the inlet means. The heater means include means for effecting the flow of water by heat transfer without pump means. Other features of the invention include filter screen means in the conduit means adjacent at least one of the inlet means and outlet means for preventing debris from entering the conduit means. The heater means is mounted in the conduit means by quick disconnect means to enable ready replacement or repair of the heater means.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
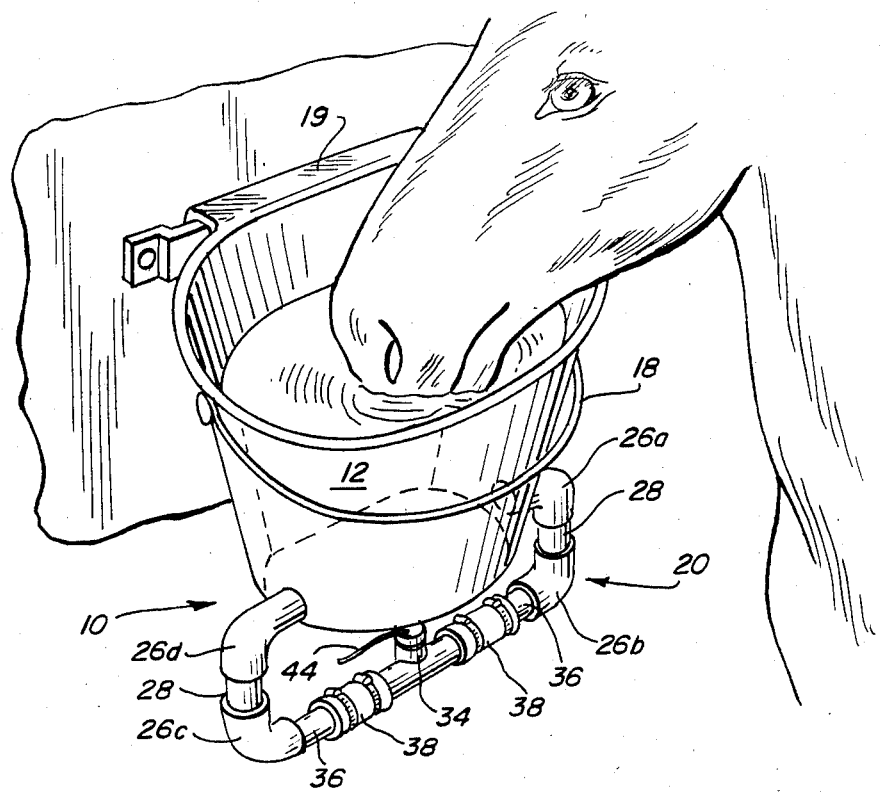
FIG. 1 is a perspective view of the livestock watering device of this invention incorporated in a water bucket having a heater means.

Referring to the drawings in greater detail, the invention contemplates a livestock watering device, generally designated 10, which includes a bucket-like container 12, having side wall means 14 and a bottom wall 16. The bucket includes a conventional pivoted handle 18, and a hook 19 for hanging the bucket from an appropriate wall, such as the wall of a stall. Of course, a variety of other means may be provided for mounting the water bucket at a proper drinking height for livestock, such as horses.

Bucket 12 is provided for holding a quantity of water and conduit means, generally designated 20, are provided communicating through side wall means 14 of the bucket to circulate heated water through the bucket. The conduit means is generally tubular and defines a closed loop with the bucket, including an outlet 22 from the bucket and an inlet 24 to the bucket.

Specifically, tubular conduit means 20 include four right-angled elbow sections 26a, 26b, 26c and 26d. Short, straight conduit sections 28 interconnect elbow 26a with elbow 26b and elbow 26c with elbow 26d. The open end of elbow 26a defines inlet 24 to bucket 12, and elbow 26d defines outlet 22 from the bucket. Filter screens 30 are provided in both inlet 24 and outlet 22 to prevent debris from entering into the conduit means. Furthermore, it can be seen that elbows 26a and 26d enter bucket 12 through apertures 32 above bottom wall 16 of the bucket so that inlet 24 and outlet 22 are spaced above the bottom wall to prevent debris which settles to the bottom of the bucket from entering the conduit means or clogging screens 30.

Heater means 34 is disposed immediately below and centrally of bucket 12 and is connected to elbows 26c, 26b by straight conduit sections 36 and flexible conduit sections 38. Spring clamps 40 secure flexible conduit sections 38 to straight conduit sections 36 as well as to heater 34. Therefore, flexible conduit sections 38 and clamps 40 provide quick disconnect means to enable ready replacement or repair of heater 34.

Elbows 26a-26d, straight conduit sections 28 and straight conduit sections 36 preferably are fabricated of relatively rigid pipe or plastic tubing. Flexible conduit sections 38 may be fabricated of rubber or like flexible material.

Figure 2:
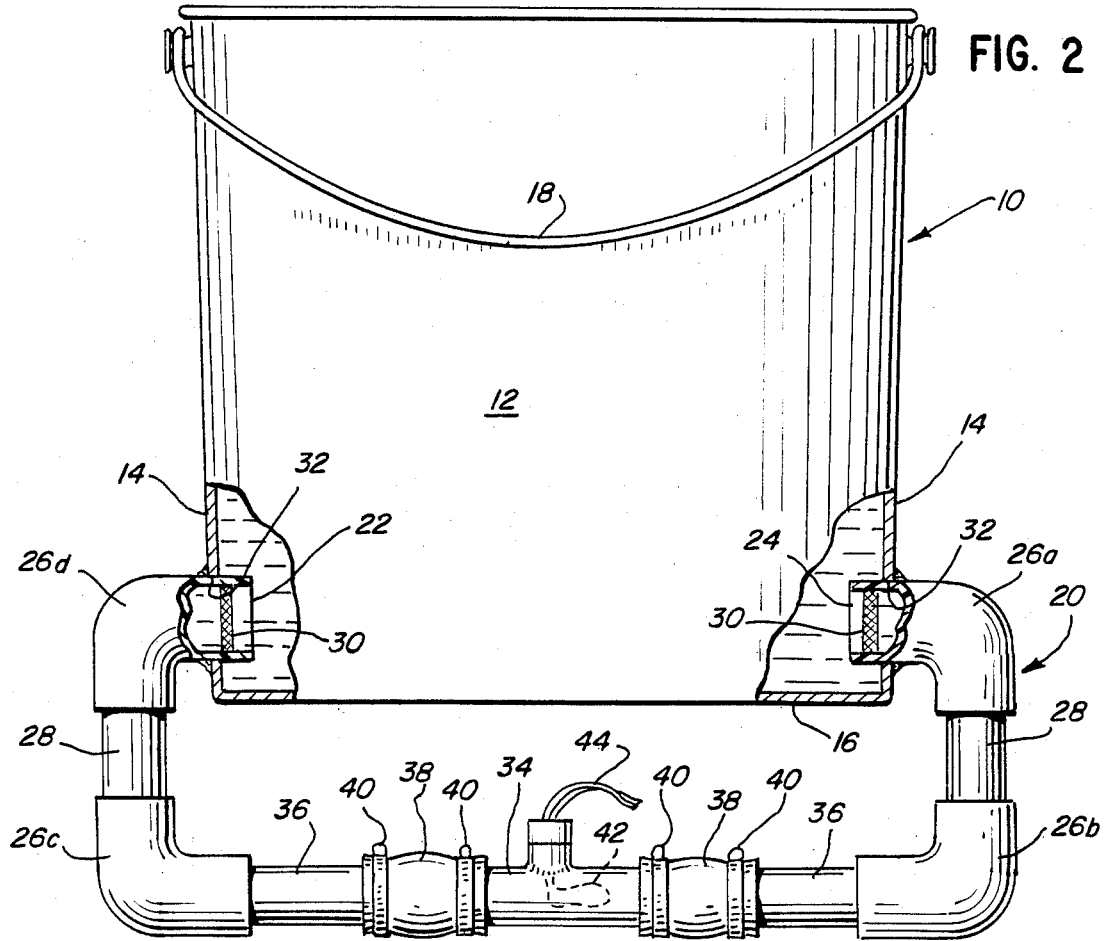
FIG. 2 is an elevational view best illustrating the positioning of the conduit means and the heater means in a closed loop about the bottom of the bucket.

Heater 34 is a flow-through liquid or fluid heating means. Although heater 34, when actuated, eventually would cause migration of hotter water upwardly into bucket 12 through inlet 24 and the migration of colder water from the bucket through outlet 22 back through the heater, an electrical heating element 42 projects to one side of the center axis of the bucket and the closed loop formed by conduit means 20. Of course, in the embodiment illustrated, the heating element 42 is directed to the right as illustrated in FIG. 2, in the direction of inlet 24 to bucket 12. This orientation of the heating element will immediately cause heated water to migrate to the right and upwardly through inlet 24 into the bucket. Colder water in the bucket thereby will migrate or substantially be forced downwardly through the flow-through heater, and a continuous flow of heated water into the bucket and colder water out of the bucket is effected through the closed loop formed by conduit means 12. Electrical cord means 44 from heater 34 can be concealed between stall boards and extended to an appropriate outlet.

The invention contemplates the selection of heater 34 to have a given value in relation to the quantity of water to be heated, whereby the heater does not have to be on at all times. This also provides a measure of safety. The invention contemplates one mode of placing a thermal switch in circuit with electrical cord 44 and sensing the temperature of the water, preferably in the return portion of conduit means 20. The switch would be of conventional means and would turn heater 34 on when the temperature of the water drops to a set low temperature. The switch would turn heater 34 off when the temperature of the water rises to a set high temperature. This mode is not necessarily dependent upon the value of the heater.

However, a very efficient mode which has proven quite effective is to place a timer (not shown) in circuit with electrical cord 44. A known timer would periodically turn the heater 34 on and off. Such a timer could be placed in circuit with any number of water buckets and heaters, whereas a thermal switch would have to be used for each bucket. An example of a proven system has been to provide heater 34 with a value of 600 watts and a water bucket of 4-5 gallons capacity. The timer was set to turn the heater on for one hour and off for one hour. The water was prevented from freezing in a small barn to 20-30 degrees below 0° F.

It can be seen that a most simple heated water system is provided for a simple water bucket to provide continuous circulation without the necessity of employing a pump or other forced-flow mechanism. Such mechanisms are expensive, require repeated maintenance or replacement, and create noise which is not inducive to encouraging an animal, such as a horse, to drink from the bucket. In fact, the heated, circulating system described herein is practically noise free. It also can be seen that the closed loop conduit means incorporating the flow through heater provides a very compact unit disposed immediately adjacent the bottom of the bucket and thereby avoids safety hazards which otherwise might be expected.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A livestock watering device, comprising:
 a bucket-like container, including side wall means and a bottom wall, for holding a quantity of water;
 conduit means including inlet means and outlet means communicating through the side wall means of the container spaced above the bottom wall thereof;
 filter means in the conduit means adjacent said outlet means; and
 heater means for heating water in the conduit means and effecting flow of water out of the container through the outlet means, through the conduit means, and back into the container through the inlet means.

2. The livestock watering device of claim 1 wherein said conduit means extend in a closed loop below the bottom wall of the container.

3. The livestock watering device of claim 2 wherein said heater means include means for effecting said flow of water by heat transfer without pump means.

4. The livestock watering device of claim 1 wherein said heater means is mounted in the conduit means by quick disconnect means to enable ready replacement or repair of the heater means.

5. The livestock watering device of claim 4 wherein said conduit means is generally rigid and said quick disconnect means include a flexible conduit section connected adjacent the heater means.

6. A livestock watering device, comprising:
 a bucket-like container, including side wall means and a bottom wall, for holding a quantity of water;
 conduit means including inlet means and outlet means communicating through the side wall means of the container spaced above the bottom wall thereof;
 filter means in the conduit means adjacent said outlet means; and
 heater means for heating water in the conduit means, the heater means being arranged to effect flow of water without pump means out of the container through the outlet means, through the conduit means, and back into the container through the inlet means.

7. The livestock watering device of claim 6 wherein said conduit means extend in a closed loop below the bottom wall of the container.

8. The livestock watering device of claim 6 wherein said heater means is mounted in the conduit means by quick disconnect means to enable ready replacement or repair of the heater means.

9. The livestock watering device of claim 8 wherein said conduit means is generally rigid and said quick disconnect means include a flexible conduit section connected adjacent the heater means.

10. A livestock watering device, comprising:
 a bucket-like container, including side wall means and a bottom wall, for holding a quantity of water;
 conduit means extending in a closed loop around the bottom wall of the container and communicating between inlet means through the side wall means at one side of the container spaced above the bottom wall and outlet means through the side wall means at an opposite side of the container spaced above the bottom wall;

filter means in the conduit means adjacent said outlet means; and heater means for heating water in the conduit means, the heater means being arranged to effect flow of water without pump means out of the container through the outlet means, through the conduit means, and back into the container through the inlet means.

11. The livestock watering device of claim 10 wherein said heater means include a heating element projecting in the direction of the conduit means toward the inlet means to promote the flow of heated water toward the inlet means.

12. The livestock watering device of claim 10 wherein said heater means is mounted in the conduit means by quick disconnect means to enable ready replacement or repair of the heater means.

13. The livestock watering device of claim 12 wherein said conduit means is generally rigid and said quick disconnect means include a flexible conduit section connected adjacent the heater means.

14. The livestock watering device of claim 10, including timer means for periodically turning said heater means on and off.

* * * * *